United States Patent
Yu et al.

(10) Patent No.: US 9,444,540 B2
(45) Date of Patent: Sep. 13, 2016

(54) SYSTEM AND METHODS FOR PERFORMING ANTENNA TRANSMIT DIVERSITY

(71) Applicant: Apple Inc., Cupertino, CA (US)

(72) Inventors: Qishan Yu, San Diego, CA (US); James T. Yang, Los Altos, CA (US)

(73) Assignee: Apple Inc., Cupertino, CA (US)

(*) Notice: Subject to any disclaimer, the term of this patent is extended or adjusted under 35 U.S.C. 154(b) by 155 days.

(21) Appl. No.: 13/631,290

(22) Filed: Sep. 28, 2012

(65) Prior Publication Data
US 2013/0149975 A1 Jun. 13, 2013

Related U.S. Application Data

(60) Provisional application No. 61/568,608, filed on Dec. 8, 2011.

(51) Int. Cl.
*H04B 7/08* (2006.01)
*H04B 7/06* (2006.01)

(52) U.S. Cl.
CPC .......... *H04B 7/0868* (2013.01); *H04B 7/0602* (2013.01)

(58) Field of Classification Search
None
See application file for complete search history.

(56) References Cited

U.S. PATENT DOCUMENTS

| | | | |
|---|---|---|---|
| 4,099,184 A | 7/1978 | Rapshys | |
| 4,958,165 A | 9/1990 | Axford et al. | |
| 5,159,707 A | 10/1992 | Mogi et al. | |
| 5,768,691 A | 6/1998 | Matero et al. | |
| 6,018,555 A | 1/2000 | Mahany | |
| 6,021,317 A | 2/2000 | Irvin | |
| 6,339,400 B1 | 1/2002 | Flint et al. | |
| 6,463,329 B1 | 10/2002 | Goedeke | |
| 6,560,443 B1 | 5/2003 | Vaisanen et al. | |

(Continued)

FOREIGN PATENT DOCUMENTS

| CN | 101529657 | 9/2009 |
|---|---|---|
| EP | 1093098 | 4/2001 |

(Continued)

OTHER PUBLICATIONS

WO-2011061946, May 2011, ids, (Google translated).*

(Continued)

*Primary Examiner* — Ping Hsieh
*Assistant Examiner* — James Yang
(74) *Attorney, Agent, or Firm* — Treyz Law Group, P.C.; Andrew C. Milhollin (57) ABSTRACT

A wireless electronic device may include switching circuits that perform time division duplexing by toggling between a first configuration in which radio-frequency signals received from antennas are routed to the transceivers and a second configuration in which the antennas are coupled to antenna switching circuitry. The antenna switching circuitry may receive radio-frequency transmission signals from the transceivers and route the transmission signals to a selected one of the antennas. The antenna switching circuitry may be controlled by control circuitry such as baseband circuitry and/or storage and processing circuitry on the device. The antenna switching circuitry may be controlled to accommodate antenna transmit diversity without affecting reception of radio-frequency signals, because the switching circuits that perform time division duplexing may form signal reception paths that are unaffected by the configuration of the antenna switching circuitry.

21 Claims, 7 Drawing Sheets

(56) References Cited

U.S. PATENT DOCUMENTS

| | | |
|---|---|---|
| 6,885,880 B1 | 4/2005 | Ali |
| 7,155,178 B2 | 12/2006 | Chang et al. |
| 7,176,838 B1 | 2/2007 | Kinezos |
| 7,239,889 B2 | 7/2007 | Saari et al. |
| 7,271,769 B2 | 9/2007 | Asano et al. |
| 7,612,725 B2 | 11/2009 | Hill et al. |
| 7,768,461 B2 | 8/2010 | Cheng et al. |
| 8,219,157 B2 | 7/2012 | Lum et al. |
| 8,781,420 B2 | 7/2014 | Schlub et al. |
| 2003/0181192 A1* | 9/2003 | Park et al. .................. 455/335 |
| 2004/0033787 A1 | 2/2004 | Weber et al. |
| 2004/0192406 A1 | 9/2004 | Okazaki et al. |
| 2004/0227674 A1 | 11/2004 | Asano et al. |
| 2004/0257283 A1 | 12/2004 | Asano et al. |
| 2005/0073462 A1 | 4/2005 | Lin |
| 2005/0215287 A1 | 9/2005 | Efland et al. |
| 2006/0001582 A1 | 1/2006 | Hayashi |
| 2006/0017621 A1 | 1/2006 | Okawara et al. |
| 2006/0034239 A1 | 2/2006 | Abeta et al. |
| 2006/0109184 A1 | 5/2006 | Chen et al. |
| 2007/0042802 A1* | 2/2007 | Park et al. ................ 455/552.1 |
| 2007/0077898 A1* | 4/2007 | Mueller et al. ................ 455/83 |
| 2007/0123174 A1 | 5/2007 | Wiessner et al. |
| 2007/0218853 A1 | 9/2007 | Yu |
| 2008/0018541 A1 | 1/2008 | Pang et al. |
| 2008/0198087 A1 | 8/2008 | Cheng et al. |
| 2008/0265977 A1* | 10/2008 | Gu ................................ 327/403 |
| 2008/0316115 A1 | 12/2008 | Hill et al. |
| 2009/0143040 A1 | 6/2009 | Man et al. |
| 2009/0207093 A1* | 8/2009 | Anreddy et al. ............. 343/876 |
| 2009/0256763 A1 | 10/2009 | Chi et al. |
| 2009/0273529 A1 | 11/2009 | Liu |
| 2010/0080204 A1 | 4/2010 | Yen et al. |
| 2010/0194647 A1* | 8/2010 | Man et al. .................... 343/702 |
| 2010/0302976 A1* | 12/2010 | Tikka ............................ 370/278 |
| 2011/0186325 A1* | 8/2011 | Myers et al. ................... 174/50 |
| 2011/0210894 A1* | 9/2011 | Man et al. .................... 343/702 |
| 2012/0009983 A1 | 1/2012 | Mow et al. |
| 2012/0112970 A1 | 5/2012 | Caballero et al. |
| 2012/0115553 A1 | 5/2012 | Mahe et al. |
| 2012/0236738 A1* | 9/2012 | Laurila ......................... 370/252 |
| 2012/0306716 A1 | 12/2012 | Satake et al. |
| 2013/0241800 A1 | 9/2013 | Schlub et al. |

FOREIGN PATENT DOCUMENTS

| | | |
|---|---|---|
| EP | 1280230 | 1/2003 |
| EP | 1295358 | 3/2003 |
| EP | 1995889 | 11/2008 |
| JP | 2001-298378 | 10/2001 |
| JP | 2005-039696 | 10/2005 |
| JP | 2006-527941 | 12/2006 |
| JP | 2008-153984 | 3/2008 |
| JP | 2010-531574 | 9/2010 |
| KR | 10-2006-0029616 | 4/2006 |
| KR | 10-02009-0081415 | 7/2009 |
| TW | 201141091 | 11/2011 |
| WO | 0159945 | 8/2001 |
| WO | 0191234 | 11/2001 |
| WO | 03096474 | 11/2003 |
| WO | 2004102744 A1 | 11/2004 |
| WO | 2004112187 | 12/2004 |
| WO | 2008-055039 | 5/2008 |
| WO | 2008055039 | 5/2008 |
| WO | 2010025023 | 3/2010 |
| WO | 2011061946 | 5/2011 |

OTHER PUBLICATIONS

Yasumura et al, JP10-150395, 1998, (machine translated).*
3GPP, 3GPP TS 36.101 V8.7.0, Sep. 2009.*
Sakaguchi et al., "Comprehensive Calibration for MIMO System", Wireless Personal Multimedia Communications, 2005. The 5th International Symposium on, Oct. 30, 2002, vol. 2, pp. 440-443.

* cited by examiner

SYSTEM AND METHODS FOR PERFORMING ANTENNA TRANSMIT DIVERSITY

This application claims priority to U.S. provisional patent application No. 61/568,608 filed Dec. 8, 2011, which is hereby incorporated by reference herein in its entirety.

BACKGROUND

This invention relates generally to electronic devices, and more particularly, to wireless electronic devices that have two or more antennas.

Electronic devices such as handheld electronic devices and other portable electronic devices are becoming increasingly popular. Examples of handheld devices include cellular telephones, handheld computers, media players, and hybrid devices that include the functionality of multiple devices of this type. Popular portable electronic devices that are somewhat larger than traditional handheld electronic devices include laptop computers and tablet computers.

Due in part to their mobile nature, portable electronic devices are often provided with wireless communications capabilities. For example, portable electronic devices may use long-range wireless communications to communicate with wireless base stations and may use short-range wireless communications links such as links for supporting the Wi-Fi® (IEEE 802.11) bands at 2.4 GHz and 5.0 GHz and the Bluetooth® band at 2.4 GHz.

Wireless electronic devices may perform antenna transmit diversity to select an optimal antenna to use when transmitting radio-frequency signals. In a conventional wireless electronic device, transmit paths and receive paths are coupled together via duplexing circuitry that isolates transmitted signals from received signals. Because the transmit and receive paths are coupled together, operation of the wireless electronic device may be inefficient. For example, receive paths must be switched along with transmit paths when performing antenna transmit diversity.

It would therefore be desirable to be able to provide electronic devices with improved wireless communications capabilities.

SUMMARY

A wireless electronic device may include antennas formed at different locations on the device. For example, the antennas may be formed at opposite ends of the device. The wireless electronic device may include transceivers that are used to wirelessly communicate in different frequency bands by transmitting and receiving radio-frequency signals in the frequency bands. The wireless electronic device may include switching circuits that accommodate time division multiplexing protocols such as Long Term Evolution-Time Division Duplexing (LTE-TDD) protocols.

The switching circuits may perform time division duplexing by toggling between a first configuration in which radio-frequency signals received from the antennas are routed to the transceivers and a second configuration in which the antennas are coupled to antenna switching circuitry. The antenna switching circuitry may receive radio-frequency transmission signals from the transceivers and route the transmission signals to a selected one of the first and second antennas. The antenna switching circuitry may be controlled by control circuitry such as baseband circuitry and/or storage and processing circuitry on the device. The antenna switching circuitry may accommodate antenna transmit diversity without affecting reception of radio-frequency signals (e.g., because the switching circuits that perform time division duplexing may form signal reception paths that are unaffected by the configuration of the antenna switching circuitry).

Further features of the present invention, its nature and various advantages will be more apparent from the accompanying drawings and the following detailed description.

DETAILED DESCRIPTION

The present invention relates generally to wireless communications, and more particularly, to wireless electronic devices with switching circuitry that accommodates antenna transmit diversity.

The wireless electronic devices may be portable electronic devices such as laptop computers or small portable computers of the type that are sometimes referred to as ultraportables. Portable electronic devices may include tablet computing devices (e.g., a portable computer that includes a touch-screen display). Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices may be handheld electronic devices.

The wireless electronic devices may be, for example, cellular telephones, media players with wireless communications capabilities, handheld computers (also sometimes called personal digital assistants), remote controllers, global positioning system (GPS) devices, tablet computers, and handheld gaming devices. The wireless electronic devices may also be hybrid devices that combine the functionality of multiple conventional devices. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

Figure 1:
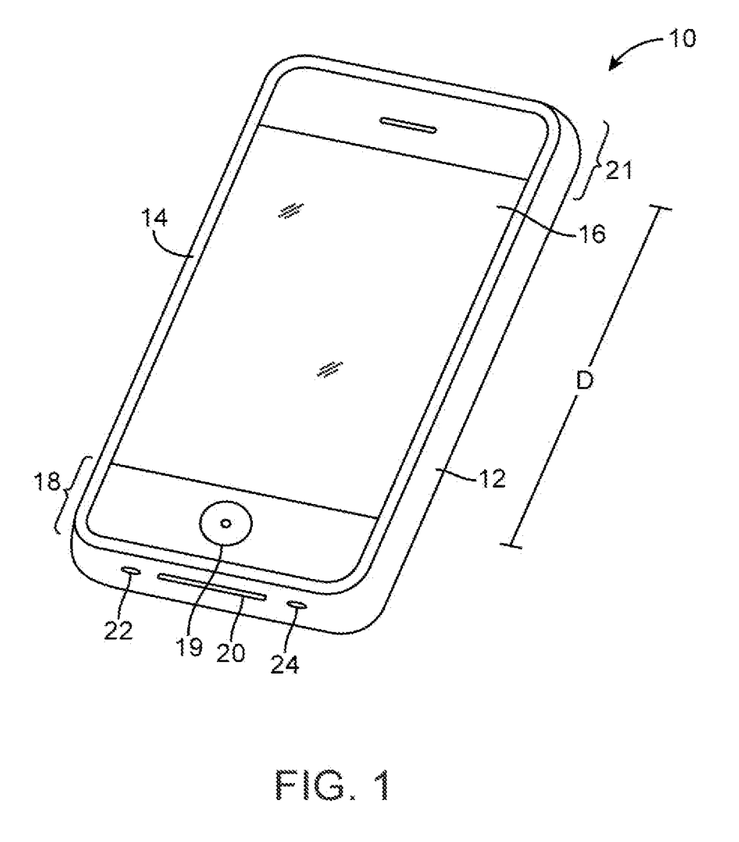
FIG. 1 is a perspective view of an illustrative electronic device with antenna switching capabilities in accordance with an embodiment of the present invention.

An illustrative wireless electronic device in accordance with an embodiment of the present invention is shown in FIG. 1. Device 10 of FIG. 1 may be, for example, a portable electronic device.

Device 10 may have housing 12. Antennas for handling wireless communications may be housed within housing 12 (as an example).

Housing 12, which is sometimes referred to as a case, may be formed of any suitable materials including, plastic, glass, ceramics, metal, or other suitable materials, or a combination of these materials. In some situations, housing 12 or portions of housing 12 may be formed from a dielectric or other low-conductivity material, so that the operation of conductive antenna elements that are located in proximity to housing 12 is not disrupted. Housing 12 or portions of housing 12 may also be formed from conductive materials such as metal. An illustrative housing material that may be used is anodized aluminum. Aluminum is relatively light in weight and, when anodized, has an attractive insulating and scratch-resistant surface. If desired, other metals can be used for the housing of device 10, such as stainless steel, magnesium, titanium, alloys of these metals and other metals, etc. In scenarios in which housing 12 is formed from metal elements, one or more of the metal elements may be used as part of the antennas in device 10. For example, metal portions of housing 12 may be shorted to an internal ground plane in device 10 to create a larger ground plane element for that device 10. To facilitate electrical contact between an anodized aluminum housing and other metal components in device 10, portions of the anodized surface layer of the anodized aluminum housing may be selectively removed during the manufacturing process (e.g., by laser etching).

Housing 12 may have a bezel 14. The bezel 14 may be formed from a conductive material and may serve to hold a display or other device with a planar surface in place on device 10. As shown in FIG. 1, for example, bezel 14 may be used to hold display 16 in place by attaching display 16 to housing 12.

Display 16 may be a liquid crystal diode (LCD) display, an organic light emitting diode (OLED) display, or any other suitable display. The outermost surface of display 16 may be formed from one or more plastic or glass layers. If desired, touch screen functionality may be integrated into display 16 or may be provided using a separate touch pad device. An advantage of integrating a touch screen into display 16 to make display 16 touch sensitive is that this type of arrangement can save space and reduce visual clutter.

Display screen 16 (e.g., a touch screen) is merely one example of an input-output device that may be used with electronic device 10. If desired, electronic device 10 may have other input-output devices. For example, electronic device 10 may have user input control devices such as button 19, and input-output components such as port 20 and one or more input-output jacks (e.g., for audio and/or video). Button 19 may be, for example, a menu button. Port 20 may contain a 30-pin data connector (as an example). Openings 24 and 22 may, if desired, form microphone and speaker ports. In the example of FIG. 1, display screen 16 is shown as being mounted on the front face of portable electronic device 10, but display screen 16 may, if desired, be mounted on the rear face of portable electronic device 10, on a side of device 10, on a flip-up portion of device 10 that is attached to a main body portion of device 10 by a hinge (for example), or using any other suitable mounting arrangement.

A user of electronic device 10 may supply input commands using user input interface devices such as button 19 and touch screen 16. Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Although shown schematically as being formed on the top face of electronic device 10 in the example of FIG. 1, buttons such as button 19 and other user input interface devices may generally be formed on any suitable portion of electronic device 10. For example, a button such as button 19 or other user interface control may be formed on the side of electronic device 10. Buttons and other user interface controls can also be located on the top face, rear face, or other portion of device 10. If desired, device 10 can be controlled remotely (e.g., using an infrared remote control, a radio-frequency remote control such as a Bluetooth® remote control, etc.).

Electronic device 10 may have ports such as port 20. Port 20, which may sometimes be referred to as a dock connector, 30-pin data port connector, input-output port, or bus connector, may be used as an input-output port (e.g., when connecting device 10 to a mating dock connected to a computer or other electronic device). Device 10 may also have audio and video jacks that allow device 10 to interface with external components. Typical ports include power jacks to recharge a battery within device 10 or to operate device 10 from a direct current (DC) power supply, data ports to exchange data with external components such as a personal computer or peripheral, audio-visual jacks to drive headphones, a monitor, or other external audio-video equipment, a subscriber identity module (SIM) card port to authorize cellular telephone service, a memory card slot, etc. The functions of some or all of these devices and the internal circuitry of electronic device 10 can be controlled using input interface devices such as touch screen display 16.

Components such as display 16 and other user input interface devices may cover most of the available surface area on the front face of device 10 (as shown in the example of FIG. 1) or may occupy only a small portion of the front face of device 10. Because electronic components such as display 16 often contain large amounts of metal (e.g., as radio-frequency shielding), the location of these components relative to the antenna elements in device 10 should generally be taken into consideration. Suitably chosen locations for the antenna elements and electronic components of the device will allow the antennas of electronic device 10 to function properly without being disrupted by the electronic components.

Examples of locations in which antenna structures may be located in device 10 include region 18 (e.g., a first antenna) and region 21 (e.g., a second antenna). Region 18 may be separated from region 21 by a distance D. These are merely illustrative examples. Any suitable portion of device 10 may be used to house antenna structures for device 10 if desired.

Figure 2:
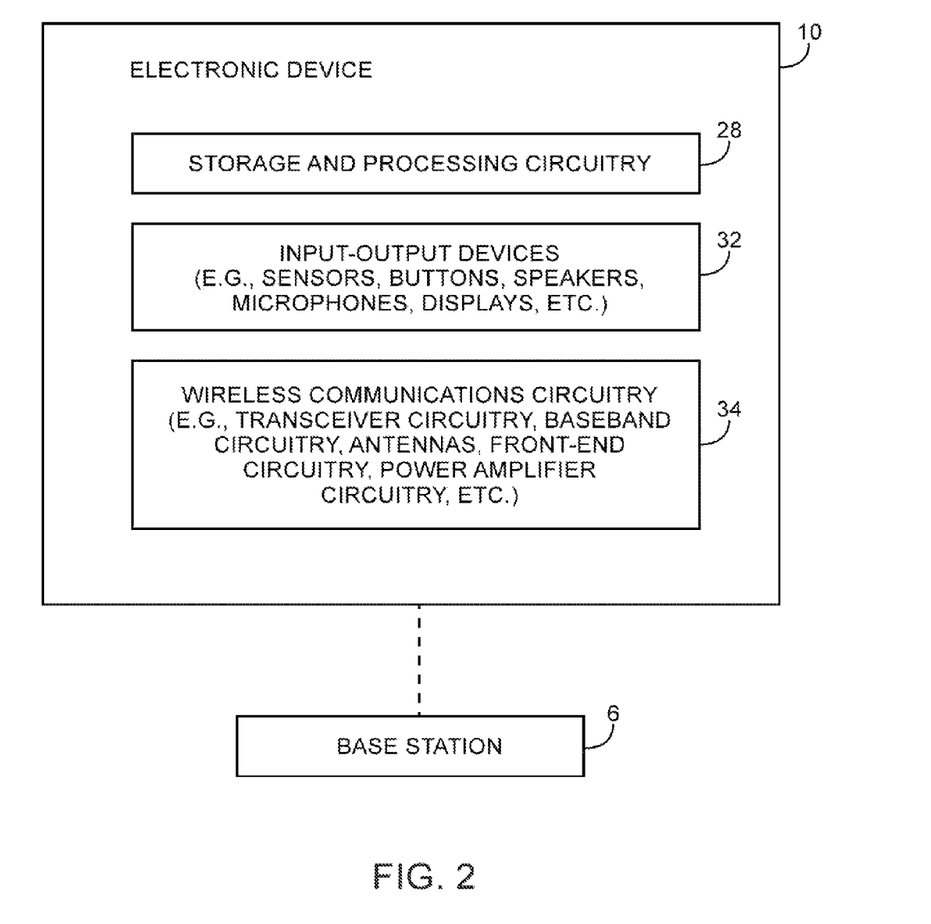
FIG. 2 is a schematic diagram of an illustrative electronic device with wireless communications circuitry in accordance with an embodiment of the present invention.

Wireless electronic devices such as device 10 of FIG. 2 may be provided with wireless communications circuitry. The wireless communications circuitry may be used to support long-range wireless communications such as communications in cellular telephone frequency bands (e.g., ranges of frequencies associated with wireless standards or protocols). Examples of long-range (cellular telephone)

bands that may be handled by device 10 include the 800 MHz band, the 850 MHz band, the 900 MHz band, the 1800 MHz band, the 1900 MHz band, the 2100 MHz band, the 700 MHz band, the 2500 MHz band, and other frequency bands. Each long-range band may be associated with a range of frequencies. For example, the 850 MHz band may be associated with frequency range 824-849 MHz and the 2500 MHz band may be associated with frequency range 2500-2570 MHz. Examples of wireless standards or protocols that are associated with the cellular telephone frequency bands include Global System for Mobile (GSM) communications standard, the Universal Mobile Telecommunications System (UMTS) standard, and standards that use technologies such as Code Division Multiple Access, time division multiplexing, frequency division multiplexing, etc. The long-range bands used by device 10 may include the so-called LTE (Long Term Evolution) bands. The LTE bands are numbered (e.g., 1, 2, 3, etc.) and are sometimes referred to as E-UTRA operating bands. As an example, LTE band 7 corresponds to uplink frequencies between 2.5 GHz and 2.57 GHz (e.g., frequencies used to transmit wireless signals to a base station) and downlink frequencies between 2.62 GHz and 2.69 (e.g., frequencies used to receive wireless signals from a base station).

Long-range signals such as signals associated with satellite navigation bands may be received by the wireless communications circuitry of device 10. For example, device 10 may use wireless circuitry to receive signals in the 1575 MHz band associated with Global Positioning System (GPS) communications. Short-range wireless communications may also be supported by the wireless circuitry of device 10. For example, device 10 may include wireless circuitry for handling local area network links such as Wi-Fi® links at 2.4 GHz and 5 GHz, Bluetooth® links and Bluetooth® Low Energy links at 2.4 GHz, etc.

As shown in FIG. 2, device 10 may include storage and processing circuitry 28. Storage and processing circuitry 28 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, functions related to radio-frequency transmission and reception such as selection of communications frequencies, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, MIMO (multiple input multiple output) protocols, antenna diversity protocols, etc. Wireless communications operations such as communications frequency selection operations may be controlled using software stored and running on device 10 (e.g., stored and running on storage and processing circuitry 28).

Electronic device 10 may include wireless communications circuitry 34 for communicating wirelessly with external equipment. Therefore, electronic device 10 may sometimes be referred to as a wireless device or a wireless electronic device. Wireless communications circuitry 34 may include radio-frequency (RF) transceiver circuitry formed from one or more integrated circuits, baseband circuitry, power amplifier circuitry, low-noise input amplifiers, passive RF components, one or more antennas, transmission lines, and other circuitry such as front-end circuitry for handling RF wireless signals. Wireless signals can also be sent using light (e.g., using infrared communications).

Wireless communications circuitry 34 may include radio-frequency transceiver circuitry for handling various radio-frequency communications bands. For example, circuitry 34 may include transceiver circuitry that handles 2.4 GHz and 5 GHz bands for Wi-Fi® (IEEE 802.11) communications and/or handles the 2.4 GHz band for Bluetooth® communications. Circuitry 34 may include cellular telephone transceiver circuitry for handling wireless communications in cellular telephone bands such as at 850 MHz, 900 MHz, 1800 MHz, 1900 MHz, 2100 MHz, the LTE bands, and other bands (as examples). Circuitry 34 may handle voice data and non14 voice data. If desired, wireless communications circuitry 34 may include global positioning system (GPS) receiver equipment for receiving GPS signals at 1575 MHz or for handling other satellite positioning data.

Wireless communications circuitry 34 may include one or more antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Antenna diversity schemes may be implemented in which multiple redundant antennas are used in handling communications for a particular band or bands. In an antenna diversity scheme, storage and processing circuitry 28 may select which antenna to use in real time based on signal strength measurements or other data. For example, storage and processing circuitry 28 may select which antenna to use for LTE communications with a base station. In multiple-input-multiple-output (MIMO) schemes, multiple antennas may be used to transmit and receive multiple data streams, thereby enhancing data throughput. In antenna receive diversity schemes, multiple antennas may be used to receive radio-frequency signals, and the received signals may be combined to enhance received signal quality.

Figure 3:
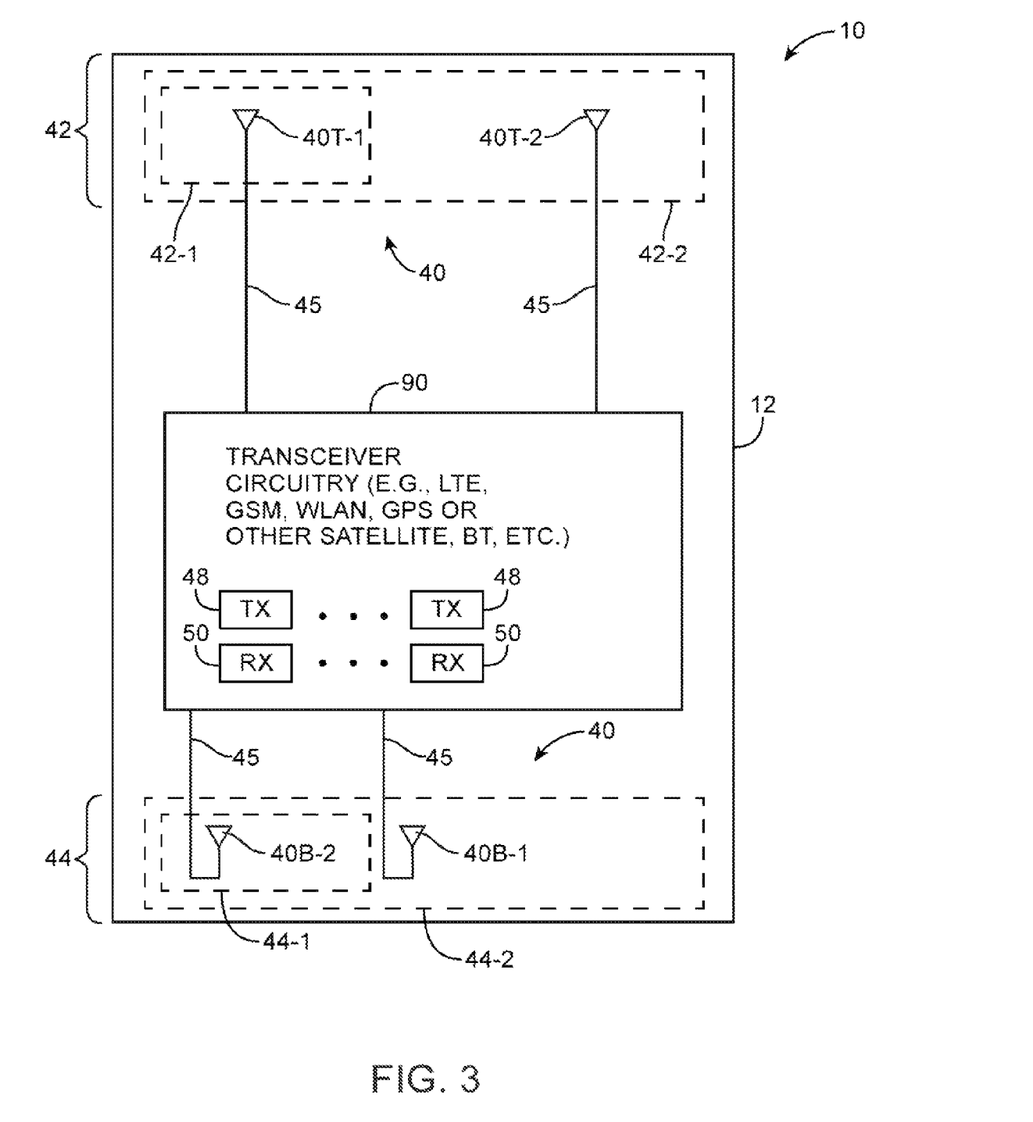
FIG. 3 is a diagram showing how radio-frequency transceiver circuitry may be coupled to one or more antennas within an electronic device in accordance with an embodiment of the present invention.

Illustrative locations in which antennas 40 may be formed in device 10 are shown in FIG. 3. As shown in FIG. 3, electronic device 10 may have a housing such as housing 12. Housing 12 may include plastic walls, metal housing structures, structures formed from carbon-fiber materials or other composites, glass, ceramics, or other suitable materials. Housing 12 may be formed using a single piece of material (e.g., using a unibody configuration) or may be formed from a frame, housing walls, and other individual parts that are assembled to form a completed housing structure. The components of device 10 that are shown in FIG. 1 may be mounted within housing 12. Antenna structures 40 may be mounted within housing 12 and may, if desired, be formed using parts of housing 12. For example, housing 12 may include metal housing sidewalls, peripheral conductive members such as band-shaped members (with or without dielectric gaps), conductive bezels, and other conductive structures that may be used in forming antenna structures 40.

As shown in FIG. 3, antenna structures 40 may be coupled to transceiver circuitry 90 by paths such as paths 45. Paths 45 may include transmission line structures such as coaxial cables, microstrip transmission lines, stripline transmission lines, etc. Paths 45 may also include impedance matching circuitry, filter circuitry, and switching circuitry. Impedance matching circuitry may be used to ensure that antennas 40 are efficiently coupled to transceiver circuitry 90 in communications bands of interest. Filter circuitry may be used to implement frequency-based multiplexing circuits such as diplexers, duplexers, and triplexers. Switching circuitry may be used to selectively couple antennas 40 to desired ports of transceiver circuitry 90. For example, in one operating mode a switch may be configured to route one of paths 45 to a given antenna and in another operating mode the switch may be configured to route a different one of paths 45 to the given antenna. The use of switching circuitry between transceiver circuitry 90 and antennas 40 allows device 10 to support multiple communications bands of interest with a limited number of antennas.

In a device such as a cellular telephone that has an elongated rectangular outline, it may be desirable to place antennas 40 at one or both ends of the device. As shown in FIG. 3, for example, some of antennas 40 may be placed in upper end region 42 of housing 12 and some of antennas 40 may be placed in lower end region 44 of housing 12. The antenna structures in device 10 may include a single antenna in region 42, a single antenna in region 44, multiple antennas in region 42, multiple antennas in region 44, or may include one or more antennas located elsewhere in housing 12.

Antenna structures 40 may be formed within some or all of regions such as regions 42 and 44. For example, an antenna such as antenna 40T-1 may be located within region 42-1 or an antenna such as antenna 40T-2 may be formed that fills some or all of region 42-1. An antenna such as antenna 40B-1 may fill some or all of region 44-2 or an antenna such as antenna 40B-2 may be formed in region 44-1. These types of arrangements need not be mutually exclusive. For example, region 44 may contain a first antenna such as antenna 40B-1 and a second antenna such as antenna 40B-2.

Transceiver circuitry 90 may contain transmitters such as transmitters 48 and receivers such as receivers 50. Transmitters 48 and receivers 50 may be implemented using one or more integrated circuits (e.g., cellular telephone communications circuits, wireless local area network communications circuits, circuits for Bluetooth® communications, circuits for receiving satellite navigation system signals). Transceiver circuitry 90 may be formed with associated power amplifier circuits for increasing transmitted signal power, low noise amplifier circuits for increasing signal power in received signals, other suitable wireless communications circuits, and combinations of these circuits.

Transceiver circuitry may communicate in frequency bands using time division multiplexing protocols. For example, the LTE standard may use time division multiplexing protocols such as protocols that use time division duplexing for selected LTE frequency bands (e.g., LTE bands 33-43). Wireless electronic devices that communicate using LTE bands 33-43 may be required to perform time division duplexing operations in which transmitted signals and received signals are each assigned to predetermined time slots. LTE bands 33-43 may therefore be referred to as Long Term Evolution-Time Division Duplexing (LTE-TDD) frequency bands.

Figure 4:
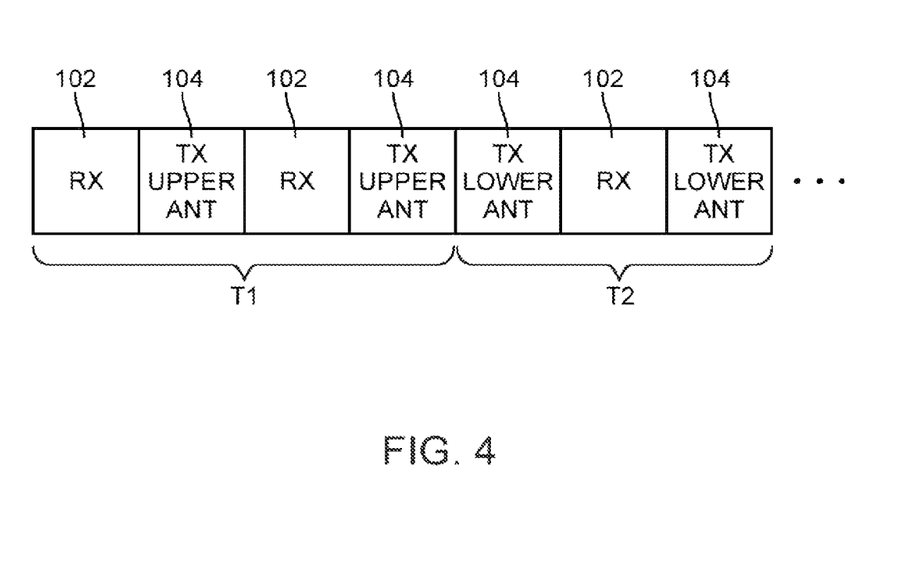
FIG. 4 is an illustrative diagram showing antenna transmit diversity operations performed simultaneously with time division multiplexing operations in accordance with an embodiment of the present invention.

FIG. 4 is an illustrative diagram showing how wireless communications using time division duplexing operations may be partitioned in time into radio-frequency signal reception and radio-frequency signal transmission. As shown in FIG. 4, signal reception may be assigned to periods (portions) of time 102 and signal transmission may be assigned to periods of time 104. Each period of time may correspond to one or more time slots (e.g., a minimum length of time defined by a given protocol for signal reception or transmission). The length of each period of time (e.g., the number of time slots assigned to that period of time) may be selected based on bandwidth requirements of reception and transmission operations. For example, if device 10 transmits more data than it receives, transmission time periods 104 may be allocated more time slots than reception time periods 102. The time slots allocated to each time period may be adjusted dynamically to accommodate changing bandwidth requirements.

Device 10 may perform antenna transmit diversity operations to select an optimal antenna for transmission time periods 104. For example, during time period T1, device 10 may identify that an upper antenna such as antenna 40T-1 should be used for radio-frequency transmissions and during time period T2, device 10 may identify that a lower antenna such as antenna 40B-1 should be used for radio-frequency transmissions. In this example, radio-frequency signals may be transmitted using upper antenna 40T-1 during time periods 104 that lie within time period T1 and radio-frequency signals may be transmitted using lower antenna 40B-1 during time periods 104 that lie within time period T2.

Figure 5:
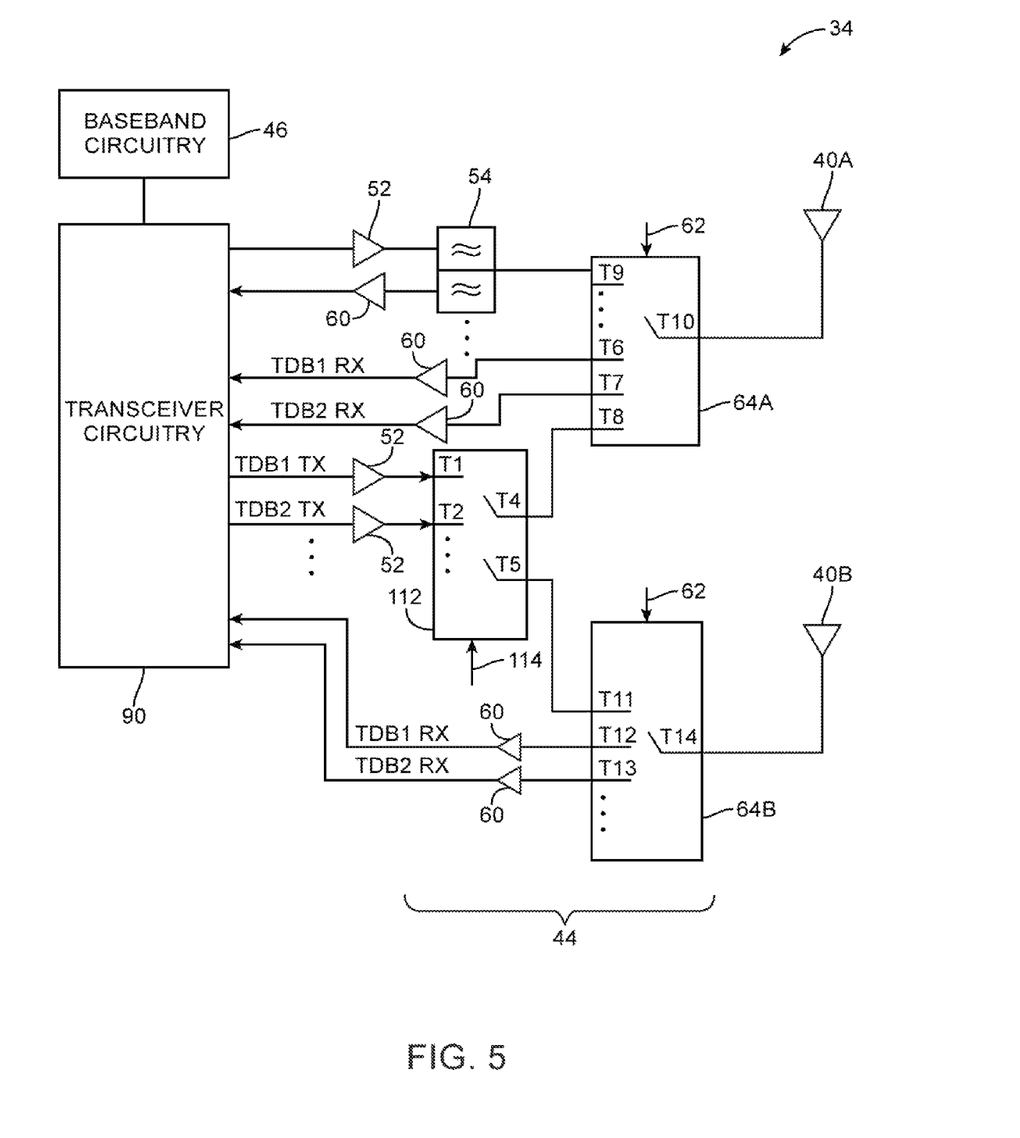
FIG. 5 is an illustrative diagram of wireless communications circuitry with antenna switching circuitry in accordance with an embodiment of the present invention.

It may be desirable to perform antenna transmit diversity operations without affecting wireless reception or other normal operations of device 10. FIG. 5 shows how wireless communications circuitry 34 (e.g., wireless communications circuitry that may be used in device 10 to handle radio-frequency communications) may be provided with antenna switching circuitry 112 that accommodates antenna transmit diversity operations for LTE-TDD frequency bands (or other frequency bands associated with time division multiplexing protocols) without affecting wireless reception in the LTE-TDD frequency bands. Wireless communications circuitry 34 may include front-end circuitry 44 that handles radio-frequency signals that are transmitted and received by wireless communications circuitry 34. Front-end circuitry 44 may include switching circuitry such as switching circuits 64A, 64B, and circuitry 112. Front-end circuitry 44 may include filtering circuitry such as duplexer 54 and other components used to handle radio-frequency signals.

Wireless communications circuitry 34 may include antennas 40A and 40B. Antennas 40A and 40B may, for example, correspond to upper and lower antennas 40T-1 and 40B-1 of FIG. 3. Antennas 40A and 40B may be coupled to respective switching circuits 64A and 64B at terminals (ports) T10 and T14. Switching circuits 64A and 64B may have ports that are associated with LTE-TDD signal reception paths and ports associated LTE-TDD signal transmission paths. For example, ports T6 and T12 may be associated with reception paths for LTE-TDD bands TDB1 and ports T7 and T13 may be associated with reception paths for LTE-TDD band TDB2. Radio-frequency signals may be received from a selected one of antennas 40A and 40B via the LTE-TDD signal reception paths or, if desired, may be received simultaneously from both antennas 40A and 40B (e.g., by performing antenna receive diversity).

Ports T8 and T11 may be associated with radio-frequency signal transmission paths (e.g., transmission paths between transceiver circuitry 90 and antennas 40A and 40B. Switching circuits 64A and 64B may be used to perform time division duplexing by alternately coupling ports associated with signal reception and signal transmission to antennas 40A and 40B. For example, during time periods 102 of FIG. 4, switching circuit 64A may be configured to couple port T6 to port T10 and during time periods 104, switching circuit 64A may be configured to couple port T8 to port T10. In other words, switching circuits 64A and 64B may be controlled to perform time division duplexing by repeatedly toggling between receive and transmit paths. Switching circuits 64A and 64B may be controlled via paths 62 (e.g., controlled by control circuitry such as baseband circuitry 46, storage and processing circuitry 28, or dedicated control circuitry associated with switching circuits 64A and 64B).

Power amplifiers 52 may be used to amplify transmitted radio-frequency signals to a desired power level (e.g., a power level sufficient for other wireless devices to receive the transmitted signals). Low noise amplifiers 60 may be used to amplify received radio-frequency signals so that the received radio-frequency signals have sufficient strength to be processed by transceiver circuitry 90.

Antenna switching circuitry 112 may be interposed between transceiver circuitry 90 and switching circuits 64A and 64B. Antenna switching circuitry 112 may include ports T1 and T2 that are associated with signal transmissions in respective LTE-TDD frequency bands. For example, port T1 may be associated with signals transmitted in LTE-TDD frequency band TDB1 (e.g., TDB1 TX) and port T2 may be associated with signals transmitted in LTE-TDD frequency band TDB2 (e.g., TDB2 TX). Antenna switching circuitry 112 may be configured via control path 114 to selectively route transmitted signals to either antenna 40A or 40B (e.g., by selectively coupling ports T1 and T2 to either ports T4 or T5). In other words, antenna switching circuitry 112 may be configured to form transmit paths between transceiver circuitry 90 and either antennas 40A and 40B. Control signals may be provided to antenna switching circuitry 112 via control path 114 from storage and processing circuitry 28, baseband circuitry 46, or any desired control circuitry.

Antenna switching circuitry 112 may accommodate antenna transmit diversity without affecting normal operations of wireless communications circuitry 34 (e.g., without affecting LTE-FDD signal reception). Consider the scenario in which wireless communications circuitry 34 communicates with a base station such as base station 6 using LTE-TDD frequency band TDB1. Wireless communications circuitry 34 may initially use antenna 40A to transmit radio-frequency signals to base station 6 in frequency band TDB1 (e.g., switching circuitry 112 may be configured to couple port T1 to port T4, thereby forming a signal transmission path between transceiver circuitry and antenna 40A). Device 10 may monitor the communications with base station 6 and determine that antenna 40B should be used for transmissions in frequency band TDB1 (e.g., based on received signal strength or other indicators of communications link quality). In response to determining that antenna 40B should be used for communications with base station 6, device 10 may configure switching circuitry 112 to couple port T1 to port T5, thereby routing transmission signals in frequency band TDB1 from transceiver circuitry 90 to antenna 40B. In this scenario, radio-frequency signal reception associated with LTE-TDD frequency band TDB1 may be unaffected by the change in the transmission signal path, because antenna switching circuitry 114 is only configured to adjust signal transmission paths.

Wireless communications circuitry 34 may accommodate other wireless standards and protocols via additional ports on switching circuits 64A and 64B. For example, wireless standards such as Long Term Evolution-Frequency Division Duplexing (LTE-FDD) may be handled by duplexer 54 that is coupled to port T9 of switching circuit 64A. In this scenario, duplexer 54 may be formed from filters such as high pass and low pass filters that perform frequency division duplexing by partitioning radio-frequency signals into transmit frequencies and receive frequencies.

The example of FIG. 5 in which antenna switching circuitry 112 has two ports associated with two LTE-TDD frequency bands is merely illustrative. If desired, antenna switching circuitry 112 may include any desired number of ports associated with multiple LTE-TDD frequency bands. If desired, antenna switching circuitry 112 may be coupled to multiple antennas (e.g., coupled to two or more antennas via switching circuits such as switching circuits 64A and 64B and/or filtering circuitry) and be configured to perform antenna transmit diversity without affecting signal reception paths by routing transmitted signals to a selected one of the antennas. If desired, antenna switching circuitry 112 may be used to perform antenna transmit diversity for any wireless standards that use time division multiplexing protocols to partition transmitted signals from received signals.

The example of FIG. 5 in which switching circuits 64A and 64B are each coupled to a single antenna is merely illustrative. If desired, switching circuits 64A and 64B may be coupled to multiple antennas via additional filtering and switching circuitry (not shown). The additional filtering and switching circuitry may accommodate additional wireless technologies such as Wi-Fi®, Bluetooth®, GPS, etc.

Figure 6:
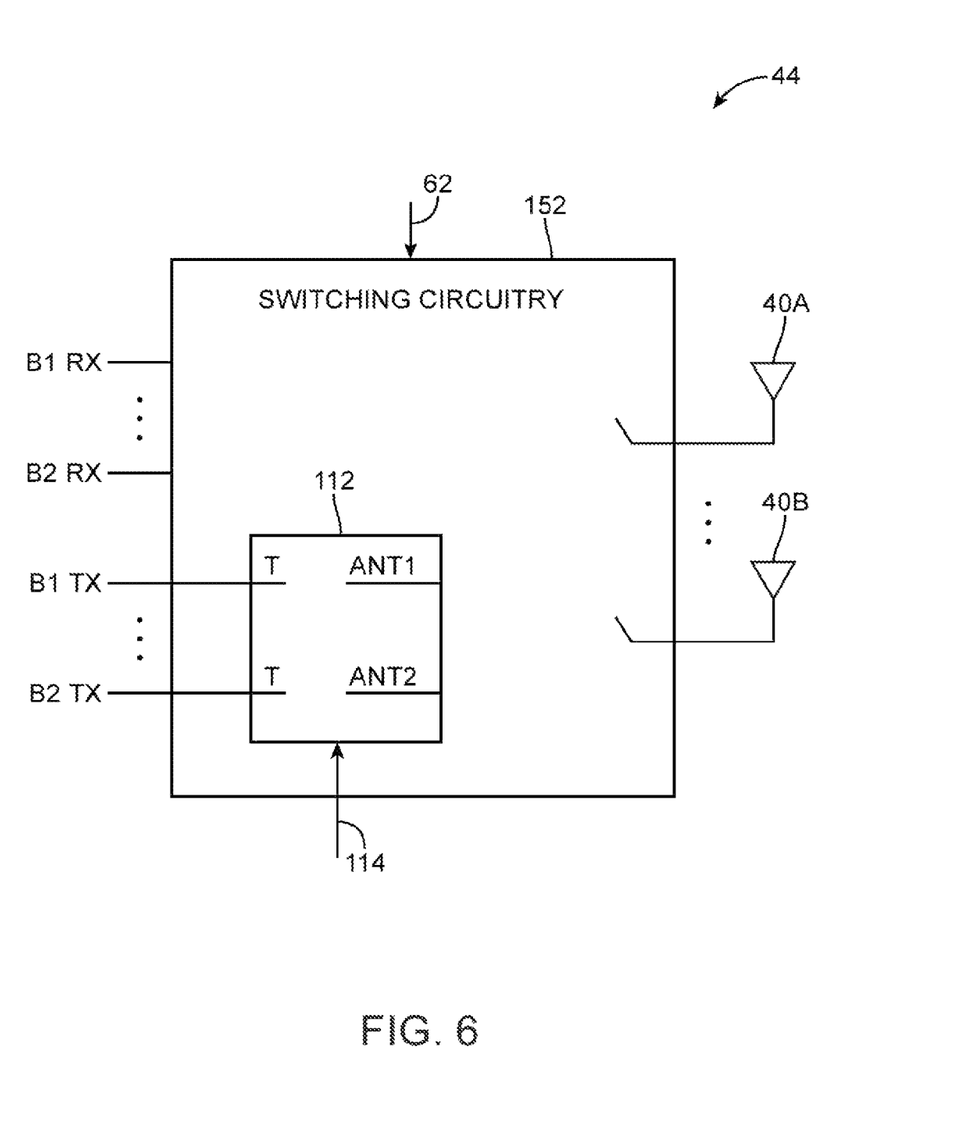
FIG. 6 is an illustrative diagram of front end circuitry with antenna switching circuitry in accordance with an embodiment of the present invention.

FIG. 6 is a diagram showing how front-end circuitry 44 may be provided with switching circuitry 152 having antenna switching circuitry 112 that receives transmitted signals at multiple frequency bands via ports T. Switching circuitry 152 may be coupled to two or more antennas (e.g., antennas 40A and 40B). Switching circuitry 152 may have ports B1 RX, B2 RX, etc. to which signals received from the antennas are provided. Switching circuitry 112 may include ports ANT1 and ANT2 that are assigned to antennas 40A and 40B, respectively.

To communicate using time division multiplexing protocols such as LTE-TDD, switching circuitry 152 may be configured via control path 62 to alternately couple each antenna to a selected receive port (e.g., ports B1 RX, B2, RX, etc.) and an assigned transmit port of antenna switching circuitry 112. For example, antenna 40A may be coupled to port B1 RX during times 102 of FIG. 4 and coupled to port ANT1 during times 104. As another example, antenna 40B may be coupled to port ANT2 during times 104. By providing switching circuitry 152 with antenna switching circuitry 112 that is dedicated to signal transmit paths, antenna transmit diversity may be performed without affecting receive paths.

Figure 7:
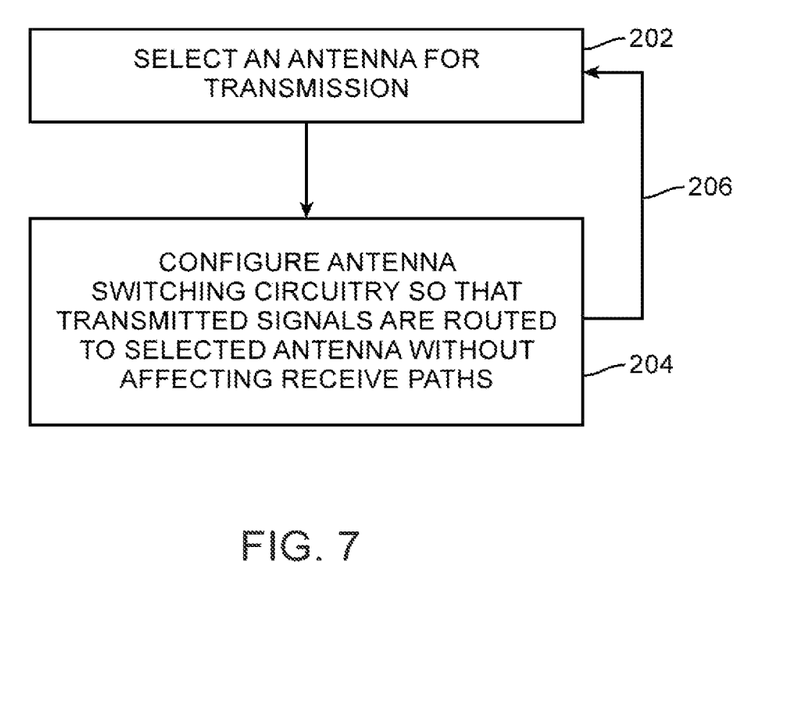
FIG. 7 is a flow chart of illustrative steps that may be performed to control antenna switching circuitry so that antenna transmit diversity is performed without affecting wireless reception paths in accordance with an embodiment of the present invention.

FIG. 7 shows a flowchart of illustrative steps that may be performed by wireless communications circuitry (e.g., by control circuitry such as storage and processing circuitry 28 or baseband circuitry 46 in wireless communications circuitry 34) to perform antenna transmit diversity without affecting wireless reception.

In step 202, the wireless communications circuitry may select an antenna for transmission. For example, the wireless communications circuitry may communicate with a base station such as base station 6 in a given frequency band using a time division multiplexing protocol such as LTE-TDD. In this scenario, the wireless communications circuitry may select the antenna for transmission based on received signal strength or other indicators of communications link quality between the wireless communications circuitry and the base station.

In step 204, the wireless communications circuitry may configure dedicated switching circuitry so that transmitted signals are routed to the selected antenna without affecting signal reception (e.g., without modifying receive paths in the wireless communications circuitry). For example, the wireless communications circuitry may provide control signals to antenna switching circuitry 112 that direct circuitry 112 to route transmit signals to the selected antenna. The control signals may be provided to antenna switching circuitry 112 via path 114 without modifying control signals that are provided to switching circuits 64A and 64B via path 62. Processing may then return to step 202 via path 206 to perform antenna transmit diversity operations without affecting wireless reception.

The foregoing is merely illustrative of the principles of this invention and various modifications can be made by those skilled in the art without departing from the scope and spirit of the invention.

What is claimed is:

1. A wireless electronic device, comprising:
    upper and lower antennas that each operate using the same broadband cellular technology;
    a housing for the wireless electronic device that comprises portions of the upper and lower antennas;
    transceiver circuitry configured to repeatedly toggle between wireless reception operations that occur during a first time period and wireless transmission operations that occur during a second time period, wherein a duration of the first time period and a duration of the second time period are each dynamically adjusted based on detected bandwidth requirements;
    a multi-transmit-port switch configured to route radio-frequency transmission signals from the transceiver circuitry to a selected antenna of the upper and lower antennas; and
    transmit-receive switching circuitry coupled between the multi-transmit-port switch and the upper and lower antennas, wherein the transmit-receive switching circuitry is operable to repeatedly toggle between a first configuration in which radio-frequency reception signals are routed from the upper and lower antennas to the transceiver circuitry and a second configuration in which the radio-frequency transmission signals are provided from the multi-transmit-port switch to the selected antenna, and in the first configuration the upper and lower antennas are coupled to the transceiver circuitry through a corresponding one of a plurality of receive paths of the transmit receive switching circuitry while bypassing the multi-transmit-port switch.

2. The wireless electronic device defined in claim 1, the transmit-receive switching circuitry comprising:
    a first switch coupled between the upper antenna and the multi-transmit-port switch; and
    a second switch coupled between the lower antenna and the multi-transmit-port switch.

3. The wireless electronic device defined in claim 2 wherein the first switch couples the upper antenna to the multi-transmit-port switch during the second configuration.

4. The wireless electronic device defined in claim 2 wherein the first switch couples the upper antenna to the transceiver circuitry during the first configuration while bypassing the multi-transmit-port switch.

5. The wireless electronic device defined in claim 2 wherein the second switch couples the lower antenna to the multi-transmit-port switch during the second configuration.

6. The wireless electronic device defined in claim 2 wherein the second switch couples the lower antenna to the transceiver circuitry during the second configuration while bypassing the multi-transmit-port switch, the wireless electronic device further comprising:
    at least one low noise amplifier coupled between the first switch and the transceiver circuitry, wherein the low noise amplifier is operable to amplify the radio-frequency reception signals.

7. The wireless electronic device defined in claim 1 further comprising:
    at least one power amplifier coupled between the transceiver circuitry and the multi-transmit-port switch, wherein the power amplifier is operable to amplify the radio-frequency transmission signals.

8. The wireless electronic device defined in claim 1, wherein the transmit-receive switching circuitry is coupled to the transceiver circuitry through at least three duplexers that are configured to perform transmit operations while bypassing the multi-transmit-port switch.

9. The wireless electronic device defined in claim 1, wherein the housing comprises a conductive housing structure that extends around a periphery of the wireless electronic device and from a rear face to a front face of the wireless electronic device, the conductive housing structure comprising portions of the upper and lower antennas.

10. A method of operating a wireless electronic device having upper and lower antennas and having a wireless electronic device housing that comprises portions of the upper and lower antennas, wherein the upper antenna and the lower antennas each operate using the same broadband cellular technology, the method comprising:
    with switching circuitry having a plurality of receive ports, and a plurality of transmit ports, selecting a receive port of the plurality of receive ports and routing radio-frequency signals received from the upper antenna to the selected receive port of the plurality of receive ports during a first time period;
    with the switching circuitry, routing radio-frequency transmit signals received at the transmit ports to a selected antenna of the upper and lower antennas during a second time period, wherein each of the plurality of receive ports is selectable with the switching circuitry when the upper antenna is selected; and
    dynamically adjusting a duration of the first time period and a duration of the second time period based on detected bandwidth requirements.

11. The method defined in claim 10 further comprising:
    with control circuitry, selecting which antenna of the upper and lower antennas should be used for wireless transmission; and
    with the control circuitry, directing the switching circuitry to route the radio-frequency transmit signals from the transmit ports to the selected antenna during the second time period.

12. The method defined in claim 11 wherein the control circuitry comprises a baseband processor, and selecting which antenna of the upper and lower antennas should be used for wireless transmission comprises:
    with the baseband processor, selecting which antenna of the upper and lower antennas should be used for wireless transmission.

13. The method defined in claim 10 further comprising:
with transceiver circuitry, providing the radio-frequency transmit signals to the transmit ports of the switching circuitry during the second time period.

14. The method defined in claim 13 further comprising:
with the transceiver circuitry, receiving the radio-frequency signals from the selected receive port of the switching circuitry during the first time period.

15. The method defined in claim 13 wherein routing the radio-frequency transmit signals received at the transmit ports to the selected antenna of the upper and lower antennas—during the second time period comprises:
routing the radio-frequency transmit signals received at the transmit ports to the selected antenna of the upper and lower antennas during the second time period without changing which receive port is selected during the first time period.

16. The method defined in claim 10, wherein the plurality of receive ports comprises at least three receive ports that convey signals in three different respective frequency bands of the broadband cellular technology.

17. Wireless communications circuitry that wirelessly communicates using at least first and second antennas, wherein each of the first and second antennas is configured to communicate using a broadband cellular technology, the wireless communications circuitry comprising:
transceiver circuitry configured to repeatedly toggle between wireless reception operations that occur during a first time period and wireless transmission operations that occur during a second time period, wherein a duration of the first time period and a duration of the second time period are each dynamically adjusted based on detected bandwidth requirements;
switching circuitry comprising first and second transmit-receive switches each having a plurality of ports, wherein the first and second transmit-receive switches are configured to provide radio-frequency transmit signals from the transceiver circuitry to only a selected antenna of the first and second antennas during the wireless transmission operations and are further configured to simultaneously route radio-frequency receive signals from both the first and second antennas to the transceiver circuitry during wireless reception operations; and
a multi-transmit-port switch that is configured to route only time domain duplexing (TDD) radio-frequency transmit signals, that is coupled to the transceiver circuitry via at least three transmit paths, and that is coupled between the transceiver circuitry and a subset of the plurality of ports on the first and second transmit-receive switches.

18. The wireless communications circuitry defined in claim 17 wherein the multi-transmit-port switch has a first port coupled to the first antenna through the first transmit-receive switch, a second port coupled to the second antenna through the second transmit-receive switch, and a third port that receives the radio-frequency transmit signals from the transceiver circuitry, and the multi-transmit-port switch is operable in a first configuration in which the first port is coupled to the third port and a second configuration in which the second port is coupled to the third port.

19. The wireless communications circuitry defined in claim 18 wherein the first transmit-receive switch is configured to couple the first antenna to the transceiver circuitry while bypassing the multi-port-transmit switch during wireless reception operations, and the first transmit-receive switch is configured to couple the first antenna to the first port of the multi-port-transmit switch during wireless transmission operations.

20. The wireless communications circuitry defined in claim 19 wherein the second transmit-receive switch is configured to couple the second antenna to the transceiver circuitry while bypassing the multi-port-transmit switch during wireless reception operations, and the second transmit-receive switch is configured to couple the second antenna to the second port of the multi-port-transmit switch during wireless transmission operations.

21. The wireless communications circuitry defined in claim 17 further comprising:
control circuitry operable to determine which antenna of the first and second antennas is provided with the radio-frequency transmit signals by the switching circuitry during wireless transmission operations, wherein the control circuitry comprises baseband circuitry.

* * * * *